(12) United States Patent
Zhao et al.

(10) Patent No.: US 8,027,067 B2
(45) Date of Patent: Sep. 27, 2011

(54) METHOD FOR CORRECTING SKEW IN SCANNED DOCUMENTS

(75) Inventors: Maria Qian Zhao, San Pablo, CA (US); Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1084 days.

(21) Appl. No.: 11/836,129

(22) Filed: Aug. 8, 2007

(65) Prior Publication Data

US 2009/0041383 A1    Feb. 12, 2009

(51) Int. Cl.
*H04N 1/04* (2006.01)
(52) U.S. Cl. ........................................ 358/474
(58) Field of Classification Search .................. 358/448, 358/471, 474; 382/287, 289, 290, 293, 295
See application file for complete search history.

(56) References Cited

U.S. PATENT DOCUMENTS

| | | | | |
|---|---|---|---|---|
| 6,804,414 B1 * | 10/2004 | Sakai et al. | ................... | 382/289 |
| 2004/0114831 A1 * | 6/2004 | Notovitz et al. | .............. | 382/296 |
| 2005/0219590 A1 * | 10/2005 | Andersen et al. | ............ | 358/1.12 |

* cited by examiner

*Primary Examiner* — Benny Tieu
*Assistant Examiner* — Jeremiah Bryar
(74) *Attorney, Agent, or Firm* — Chen Yoshimura LLP

(57) ABSTRACT

An apparatus and method for deskewing a scanned printed document is described. The original printed document is scanned with the scanner to obtain a first digital image, which contains skew (rotation) with respect to the original printed document. The first digital image is digitally flipped around a centerline to obtain a second digital image, which is printed to generate a second printed document. The second printed document is scanned using the same scanner to obtain a third digital image, which contains skew errors with respect to the second printed document. The third digital image is digitally flipped around the centerline to obtain a final digital image, which is substantially free of the skew introduced by the scanner.

5 Claims, 2 Drawing Sheets

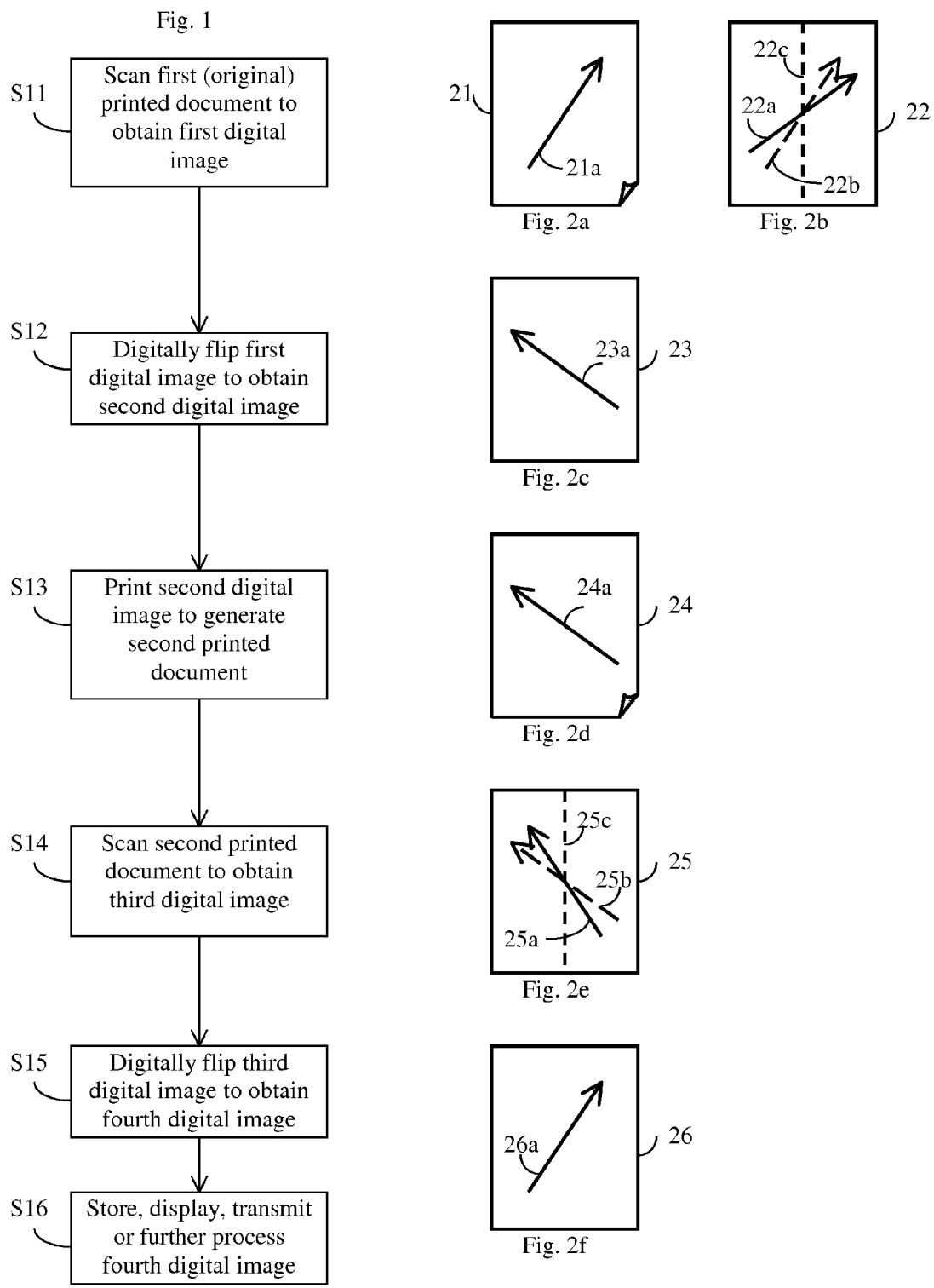

METHOD FOR CORRECTING SKEW IN SCANNED DOCUMENTS

BACKGROUND OF THE INVENTION

1. Field of the Invention

This invention relates to a method for scanning printed documents, and in particular, it relates to a method for correcting skew in scanned documents.

2. Description of Related Art

Scanners are widely used to convert a printed document into digital forms. The scanning process, however, often introduces various types of distortions in the scanned document images. Distortions introduced may be due to misalignment of the paper with the scanbed, the paper not placed completely flat against the scan surface, or deviations in the position of the CCD module such that the scan start line is not detected exactly, etc. One example of distortions is a rotation of the image (often referred to as skew). Other examples include a compression or expansion of the image in one direction relative to another direction, non-uniform distortions (where different parts of the document have different distortions), etc. Post-scanning digital image processing may be carried out to correct for certain distortions.

SUMMARY

The present invention is directed to a method for correcting skew introduced in a scanning process by utilizing a print-scan closed-loop process as a correction mechanism.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for correcting skew introduced by a scanner when scanning an original printed document, which includes: scanning the original printed document using the scanner to obtain a first digital image, the first digital image containing skew with respect to the original printed document; digitally flipping the first digital image around a centerline to obtain a second digital image; printing the second digital image to generate a second printed document; scanning the second printed document using the scanner to obtain a third digital image, the third digital image containing skew with respect to the second printed document; and digitally flipping the third digital image around the centerline to obtain a fourth digital image.

In another aspect, the present invention provides a data processing system which includes: a printing section for generating printed documents from digital images; a scanning section for scanning printed documents to generate digital images; and a control section for controlling the printing section and the scanning section, wherein the control section controls the scanning section to scan an original printed document to obtain a first digital image which contains skew with respect to the original printed document, digitally flips the first digital image around a centerline to obtain a second digital image, controls the printing section to print the second digital image to generate a second printed document, controls the scanning section to scan the second printed document to obtain a third digital image which contains skew with respect to the second printed document, and digitally flips the third digital image around the centerline to obtain a fourth digital image.

It is to be understood that both the foregoing general description and the following detailed description are exemplary and explanatory and are intended to provide further explanation of the invention as claimed.

BRIEF DESCRIPTION OF THE DRAWINGS

FIG. 1 illustrates a method for correcting skew in a scanned document image according to an embodiment of the present invention.

FIGS. 2a to 2f illustrate the document and image at various stages of the skew correction method.

DETAILED DESCRIPTION OF PREFERRED EMBODIMENTS

Figure 3:
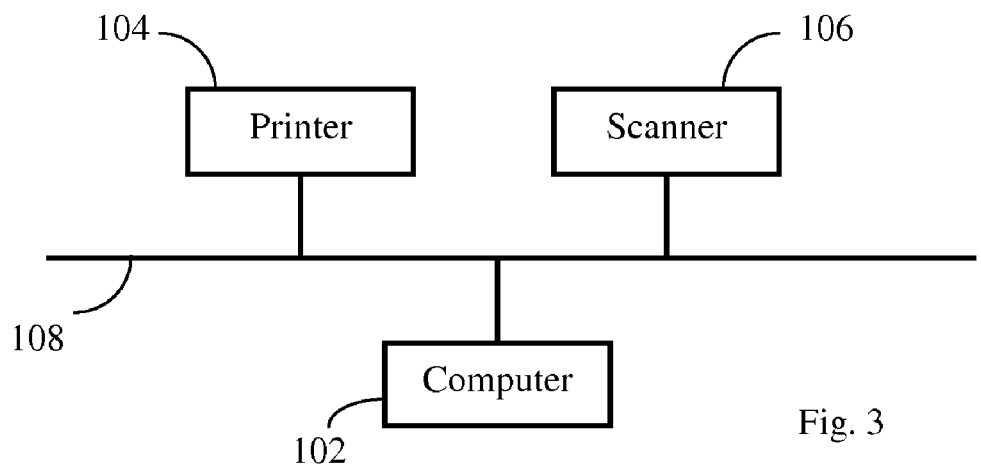
FIG. 3 schematically illustrates a system including a computer, a printer and a scanner, in which the skew correction method according to embodiments of the present invention may be implemented.

FIG. 3 schematically illustrates a data processing system in which a skew correction method according to embodiments of the present invention may be implemented. The data processing system includes a computer 102, a printer 104, and a scanner 106 connected by a communication link 108. The computer 102, printer 104 and scanner 106 each include standard hardware and software components familiar to those skilled in the relevant art and detailed descriptions of them are omitted here. The skew correction method is implemented using the printer and the scanner, and various digital processing steps involved as will be described in more detail later may by implemented as software or firmware executed by a processor on either the computer 102, the printer 104 or the scanner 106. Although they are illustrated as separate components, the printer 104 and the scanner 106 may be the same piece of physical equipment, such as an all-in-one device (AIO, also referred to as a multifunction device) that includes both printing and scanning functions (see FIG. 4). The communication link 108 may be any type of network or direct connections between the computer and the printer and scanner or AIO.

A process of printing a digital document using a printer and then scanning the printed document using a scanner to obtain a scanned digital document is sometimes referred to as a closed-loop process. The skew correction method according to embodiments of the present invention corrects for skew (rotation error) by utilizing the closed-loop process itself as a correction mechanism. The method is described with reference to FIGS. 1 and 2a-2f.

First, a first printed document 21 schematically shown in FIG. 2a is scanned using the scanner 106 to obtain a first digital image 22 schematically shown in FIG. 2b (step S11 in FIG. 1). The first printed document 21, or the original printed document, may be a document that has been printed from the printer 104, a document printed by another printer or copier, or any other printed matter that the user desires to obtain a scanned digital version of. The document may contain text, graphics, image, etc. An arrow 21a in FIG. 2a schematically represents content features such text, graphics or image in the original printed document 21. As shown in FIG. 2b, in the first digital image 22, the content features appear to be rotated due to skew errors in the scanning process. The arrow 22a schematically represents the content features as they appear in the first digital image, where the arrow 22b schematically represents where the content features should be if there were no skew errors. Then, the first digital image 22 is digitally flipped around the vertical centerline 22c of the page to obtain a second digital image 23 schematically shown in FIG. 2c (step S12). This step is performed by the computer 102, which stores (at least temporarily) the various intermediate digital images. The content features in the second digital image, schematically represented by the arrow 23a, are a mirror image of the content features in the first digital image 22 schematically represented by the arrow 22a.

Next, the second digital image 23 is printed using the printed 104 to generate a second printed document 24 schematically shown in FIG. 2d (step S13). As the printing process generally does not introduce any skew errors, the content features in the second printed document, as represented by the arrow 24a, appear at the same location as they do in the second digital image 23 as represented by the arrow 23a. The second printed document 24 is then scanned again using the same scanner 106 to obtain a third digital image 25 schematically shown in FIG. 2e (step S14). Because the same scanner 106 is used, the same or similar rotation error occurs in this scanning process as in the first scanning process (i.e. step S11). Thus, as shown in FIG. 2e, the content features in the third digital image 25 appear to be rotated as compared to the second printed document 24. The arrow 25a schematically represents the content features as they appear in the third digital image, where the arrow 25b schematically represents where the content features should be if there were no skew errors. The amount and direction of rotation between the arrows 25a and 25b in the third digital image is the same or similar to the amount of rotation between the arrows 22a and 22b in the first digital image. Last, the third digital image 25 is digitally flipped around the vertical centerline 25c of the page to obtain a fourth digital image 26 schematically shown in FIG. 2f (step S15). As a result of the two scanning processes and two digital flipping operations, the fourth (final) digital image shown in FIG. 2f closely resembles the image of the original document shown in FIG. 2a without significant rotation. In other words, the correction method substantially removes the rotation error introduced by the scanner.

The final digital image can be used as desired by the user, such as stored, displayed, transmitted to another computer, or further processed for various purposes such as content extraction, authentication, etc. (step S16).

Although in the above examples the digital flipping is done around the vertical centerline, the images may also be flipped around the horizontal centerline.

Figure 4:
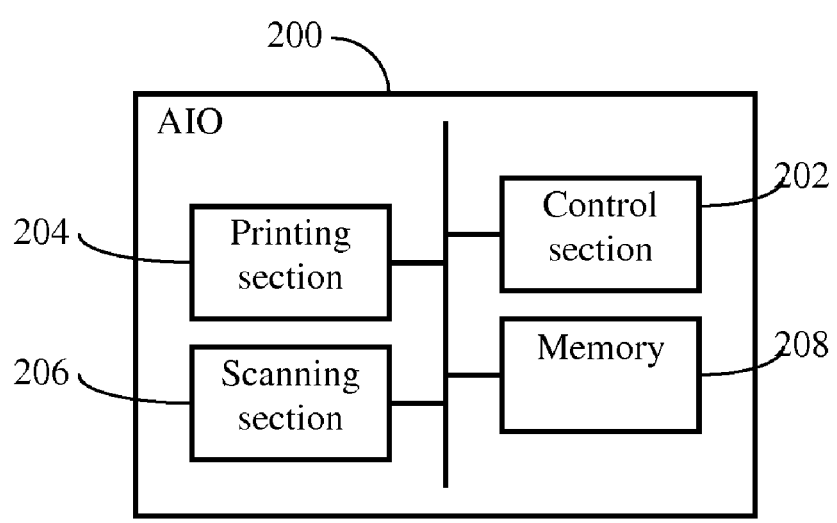
FIG. 4 schematically illustrates an all-in-one device in which the skew correction method according to embodiments of the present invention may be implemented.

In the skew correction method described above, the digital flipping operations (steps S12 and S15) are performed by the computer 102. Alternatively, they may be performed by a processor in the scanner or the printer. This may be particularly convenient when the printer and scanner are in the same all-in-one device (AIO). In such a case, the AIO may be programmed to perform the first scanning (step S11), digital flipping (step S12), and printing (step S13) without user intervention. The user then feeds the second printed document back to the scanner (the AIO may be programmed to display instructions to prompt the user to feed the document), and the AIO performs the second scanning (step S14) and digital second flipping (step S15) to obtain the final digital image. The final digital image can then be stored or sent to another computer to be further utilized. In other words, the functionality of the computer 102, printed 104 and scanner 106 may be located in the same AIO, and the user can perform the entire operation while being located at the AIO. The structure of an AIO is schematically illustrated in FIG. 4. The AIO 200 includes a printing section 204, a scanning section 206, a control section 202 (such as a processor), a memory 208, and other necessary or optional components not shown in FIG. 4.

One advantage of the skew correction method according to embodiments of the present invention is that it eliminates the need for complex post-scanning digital image processing. Digital flipping is a simple operation that does not require complex computation.

The correction method described above may also be applicable to certain other types of errors in addition to skew (rotation error).

It will be apparent to those skilled in the art that various modification and variations can be made in the skew correction method of the present invention without departing from the spirit or scope of the invention. Thus, it is intended that the present invention cover modifications and variations that come within the scope of the appended claims and their equivalents.

What is claimed is:

1. A method for correcting skew introduced by a scanner when scanning an original printed document, comprising:
    scanning the original printed document using the scanner to obtain a first digital image, the first digital image containing skew with respect to the original printed document;
    digitally flipping the first digital image around a centerline to obtain a second digital image;
    printing the second digital image to generate a second printed document;
    scanning the second printed document using the scanner to obtain a third digital image, the third digital image containing skew with respect to the second printed document; and
    digitally flipping the third digital image around the centerline to obtain a fourth digital image.

2. The method of claim 1, wherein the centerline is a vertical centerline.

3. The method of claim 1, further comprising displaying, storing or transmitting the fourth digital image.

4. A data processing system comprising:
    a printing section for generating printed documents from digital images;
    a scanning section for scanning printed documents to generate digital images; and
    a control section for controlling the printing section and the scanning section,
    wherein the control section is programmed to control the scanning section to scan an original printed document to obtain a first digital image which contains skew with respect to the original printed document, to digitally flip the first digital image around a centerline to obtain a second digital image, to control the printing section to print the second digital image to generate a second printed document, to control the scanning section to scan the second printed document to obtain a third digital image which contains skew with respect to the second printed document, and to digitally flip the third digital image around the centerline to obtain a fourth digital image.

5. The data processing system of claim 4, wherein the centerline is a vertical centerline.

* * * * *